United States Patent [19]

Brawand

[11] Patent Number: 5,123,312
[45] Date of Patent: Jun. 23, 1992

[54] HUB MOUNTED SUPPORT FOR A WHEEL LUG WRENCH

[76] Inventor: Franklin M. Brawand, P.O. Box 1730, Florence, Oreg. 97439

[21] Appl. No.: 793,189

[22] Filed: Nov. 18, 1991

[51] Int. Cl.⁵ ............................................. B25B 23/00
[52] U.S. Cl. ...................................... 81/462; 81/180.1
[58] Field of Search ............................. 81/462, 180.1

[56] References Cited

U.S. PATENT DOCUMENTS

| | | | |
|---|---|---|---|
| 2,459,672 | 1/1949 | Morsch | 81/462 |
| 2,614,444 | 10/1952 | Moore | 81/462 |
| 2,632,350 | 3/1953 | Kaster | 81/462 |

*Primary Examiner*—Bruce M. Kisliuk
*Assistant Examiner*—Lawrence Cruz
*Attorney, Agent, or Firm*—James D. Givnan, Jr.

[57] ABSTRACT

A lug wrench support for temporary placement on a wheel hub and including a sleeve having appendages on the sleeve outer wall defining wrench receiving grooves. A first internal wall surface of the sleeve is of diameter to receive and frictionally engage a wheel hub while a second internal wall surface of the sleeve is of a lesser diameter and frictionally engages a wheel hub of lesser size than the first mentioned wheel hub. The wrench receiving grooves support that portion of a lug wrench adjacent the socket end of the wrench during rotation of wheel lug nuts. An eye of each appendage serves to retain the lug wrench in the appendage groove.

5 Claims, 1 Drawing Sheet

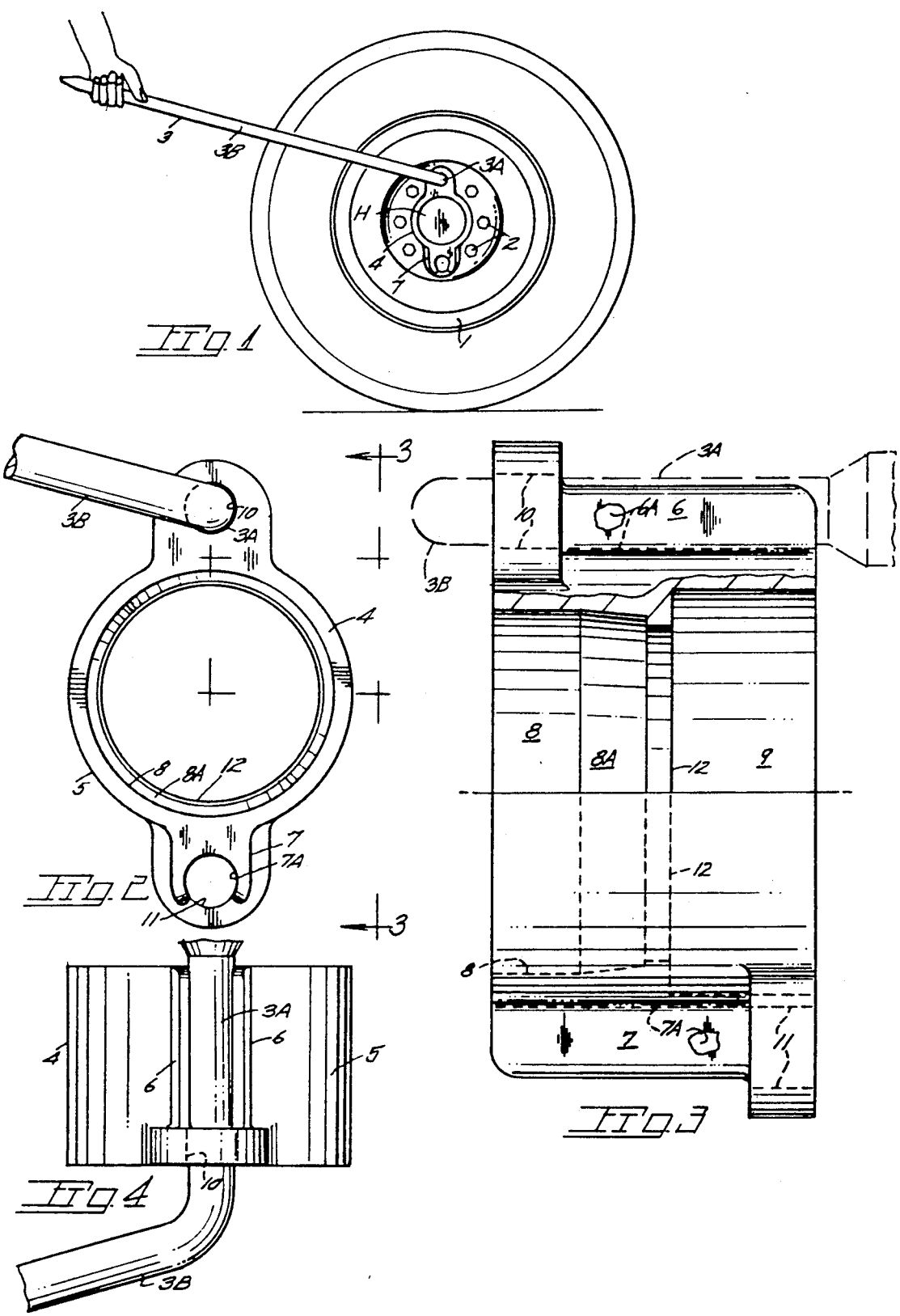

HUB MOUNTED SUPPORT FOR A WHEEL LUG WRENCH

BACKGROUND OF THE INVENTION

The present invention relates generally to a support for a lug wrench to facilitate removal and installation of lug nuts on a vehicle wheel. The removal of a vehicle wheel by use of a lug wrench is oftimes rendered difficult by reason of the lug nut being originally driven home with an impact type wrench. After the wheel has been on the vehicle for some time, the removal of the wheel by the owner using a lug wrench is made difficult as the break away torque required to initially rotate the nut will exceed the final torque load applied by the impact wrench. Further, the use of a lug wrench in the changing of the wheel is greatly hindered by the tendency of the wrench to become misaligned with the wheel stud and lug nut thereon. The application of force to a lug nut wrench when the lug wrench socket and nut are misaligned can result in sudden slippage of the wrench and injury to the user's hand. Still further, the practice of utilizing one hand to stabilize the end of the lug wrench adjacent the wheel is not possible when the wheel is a size protruding outwardly from the wheel to restrict clearance between the lug wrench end segment and the hub.

In the instance where the lug nuts are worn or excessive play exists between the lug wrench socket and the lug nuts, the problem of maintaining the alignment is particularly difficult when extreme force must be applied to the wrench during wheel removal.

U.S. Pat. Nos. 2,632,350; 2,459,672 and 2,614,444 are of interest in that they disclose hub supported wrench supports.

SUMMARY OF THE PRESENT INVENTION

The present invention is embodied within a wrench support that firmly engages wheel hubs of different sizes to support a lug wrench in precise alignment with the lug nut.

The present wrench support includes a sleeve with inner wall surfaces for frictional engagement with wheel hubs of a vehicle which typically are of different diameter and configuration. The present wrench support includes a sleeve appendage which supports the lug wrench in a rotatable manner while an eye of the appendage confines the wrench against misalignment and sudden separation from the lug nut. The wrench support sleeve may be formed with various internal wall configurations to permit use on various types and models of vehicles and is particularly directed toward use with vehicles having protruding hub structures as for example, four-wheel drive vehicles and pickup trucks. The present wrench support includes two internal wall surfaces each extending inwardly from an end of the support and each configured for seating in snug engagement with a hub so as to rotatably support a wrench against heavy loads.

Important objectives of the present invention include the provision of a lug wrench support of unitary design for temporary placement on a wheel hub to securely support a wrench during lug nut removal and driving of lug nuts; the provision of a wrench support which permits utilization of a conventional lug wrench which is captivated for rotational movement about an axis aligned with a wheel stud; the provision of a wrench support which may be of molded construction for low cost manufacturing.

BRIEF DESCRIPTION OF THE DRAWINGS

In the accompanying drawings,

FIG. 1 shows the present wrench support in front elevation in place on a wheel hub;

FIG. 2 is an enlarged front elevational view of the present wrench support shown in FIG. 1 and removed from the wheel;

FIG. 3 is a side elevational view taken along irregular line 3—3 of FIG. 2 and with parts broken away; and FIG. 4 is a plan view of FIG. 2.

DETAILED DESCRIPTION OF THE PREFERRED EMBODIMENTS

With continuing attention to the drawings wherein applied reference numerals indicate parts similarly hereinafter identified, the reference numeral 1 indicates the wheel of a vehicle secured in place by a series of lug nuts 2. A lug wrench 3 may be of typical construction having an end segment 3A in alignment with a wheel stud and an inclined segment 3B to which force may be manually applied. A wheel hub is at H.

With attention now to the present wrench support indicated at 4, the same is of generally sleeve construction having an outer wall surface 5 on which, as shown, are provided appendages at 6 and 7 each having an internal wall surface 6A-7A to form a groove or channel. Internally of the sleeve, is a first internal wall surface at 8 and a second internal wall surface at 9 denoted by an internal rim 12. The internal wall surfaces 8 and 9 are of a diameter and shape to effect snug frictional engagement with the outer wall surfaces of different sized wheel hubs. For example, sleeve internal wall surface 8 and conical segment 8A are shaped for frictional engagement with the external surface of a front wheel hub while sleeve internal surface 9 is of a configuration for like engagement with a different sized rear wheel hub of a pickup truck. The internal wall surfaces 8 and 9 at least partially correspond to the external or outer wall surfaces of the vehicle's front and rear hubs to permit precise frictional engagement of the support on the hub structures.

With attention now to the appendages indicated at 6 and 7, the appendages extend in an axial direction with internal surfaces at 6A-7A to receive lug wrench end segment 3A. Accordingly the wrench segment so seated is restrained against accidental dislodgement from the channel. Additionally, each appendage has an eye or aperture at 10 and 11 through which is inserted the lug wrench handle end with the eye serving to further confine the wrench end segment against escape from the channel. Such wrench installation in the appendage is of course accomplished prior to application of the sleeve to the wheel hub.

In removing of wheel lug nuts the present wrench support is positioned incrementally about the hub so as to align the wrench end segment and socket with each wheel stud and the lug nut thereon. Once the nuts have been broken away from their seated positions, the wheel may be elevated and the nuts removed without aid of the wrench support. Conversely, in the seating of lug nuts in place onto a newly installed wheel, the wrench and wrench support are advanced in increments about the wheel hub to apply the necessary torque to each lug nut. Considerable force may be applied to the lug wrench without risk of sudden disengagement of the wrench from the lug nut and risk of injury. In addition to internal wall surfaces of sleeve 4 being formed to suit different vehicle hubs the grooves and apertures associated therewith will be formed on radii to accommodate lug nut spacing from a wheel center.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. A lug wrench support for temporary placement on a wheel hub and comprising,
    a sleeve,
    a first appendage on the sleeve outer wall and defining a first wrench receiving groove,
    a first internal wall surface extending axially of said sleeve and of diameter to receive and frictionally engage a wheel hub,
    a second internal wall surface extending axially of said sleeve and of a diameter to receive and frictionally engage a wheel hub of lesser diameter than the first mentioned wheel hub,
    a second appendage on said sleeve outer wall and defining a second wrench receiving groove,
    said first and second wrench receiving grooves for supporting that portion of a lug wrench proximate the distal end of the wrench during rotation of wheel lug nuts.

2. The wrench support claimed in claim 1 wherein said first and second appendages each define an aperture through which a lug wrench is insertable preparatory to use.

3. The wrench support claimed in claim 1 wherein said first internal wall surface includes a conical segment.

4. The wrench support claimed in claim 3 wherein said first internal wall surface additionally includes a cylindrical segment.

5. The wrench support claimed in claim 2 wherein each aperture defined by the first and second appendages are adjacent opposite ends of the sleeve.

* * * * *